(12) United States Patent
Perry et al.

(10) Patent No.: US 11,598,194 B1
(45) Date of Patent: Mar. 7, 2023

(54) STIMULATION AND CONTINUOUS RECOVERY OF BIOGENIC GAS FROM COAL BEDS

(71) Applicant: I.P. CO, LLC, Denver, CO (US)

(72) Inventors: Michael S. Perry, Denver, CO (US); Gerald Luken, Gillette, WY (US)

( * ) Notice: Subject to any disclaimer, the term of this patent is extended or adjusted under 35 U.S.C. 154(b) by 266 days.

(21) Appl. No.: 16/859,808

(22) Filed: Apr. 27, 2020

Related U.S. Application Data

(63) Continuation-in-part of application No. 16/212,071, filed on Dec. 6, 2018, now Pat. No. 10,934,788, and a continuation-in-part of application No. 15/355,929, filed on Nov. 18, 2016, now Pat. No. 10,633,963.

(51) Int. Cl.
*E21B 43/38* (2006.01)
*C09K 8/582* (2006.01)
*E21B 43/00* (2006.01)

(52) U.S. Cl.
CPC .............. *E21B 43/38* (2013.01); *C09K 8/582* (2013.01); *E21B 43/006* (2013.01)

(58) Field of Classification Search
None
See application file for complete search history.

(56) References Cited

U.S. PATENT DOCUMENTS

| | | | |
|---|---|---|---|
| 2,877,852 A | 3/1959 | Bashara | |
| 7,484,560 B2 | 2/2009 | Lai et al. | |
| 10,151,185 B2 | 12/2018 | Urynowicz et al. | |
| 10,633,963 B1* | 4/2020 | Perry | C12N 1/20 166/246 |
| 2003/0079876 A1* | 5/2003 | Underdown | E21B 43/084 166/265 |
| 2004/0033557 A1* | 2/2004 | Scott | C09K 8/62 435/132 |
| 2010/0047793 A1* | 2/2010 | Toledo | E21B 43/006 435/243 |
| 2011/0011586 A1 | 1/2011 | Dusterhoft et al. | |
| 2013/0092370 A1* | 4/2013 | Urynowicz | C12N 1/20 166/246 |
| 2017/0145442 A1 | 5/2017 | Wyart et al. | |

FOREIGN PATENT DOCUMENTS

WO   WO 2007/022122   *   2/2007   ............ E21B 43/22

\* cited by examiner

*Primary Examiner* — Andrew Sue-Ako
(74) *Attorney, Agent, or Firm* — Reilly Intellectual Property Law Firm

(57) ABSTRACT

A method of enhanced biogenic methane production and recovery of biogenic gas without removal of formation water is disclosed through introduction of carbohydrates causing biostimulation of methanogenic microorganisms allowing recovery of methane without removal of formation waters.

19 Claims, 12 Drawing Sheets

STIMULATION AND CONTINUOUS RECOVERY OF BIOGENIC GAS FROM COAL BEDS

FIELD

The present method relates to gas extraction from wells. In particular, it relates to a method of enhanced biogenic methane production and recovery of biogenic gas without removal of formation waters.

BACKGROUND

Removal of gas from gas producing formations is generally accomplished by separating gas from liquids present in the formations. For example, coal bed methane is a form of natural gas that can be extracted from coal bed formations. Coal bed methane is methane gas that is contained in coal seams as a result of biological processes. Methane is adsorbed into the matrix of the coal and lines the inside pores within the coal. It is often produced at shallow depths through a bore hole that allows gas and water to be produced.

Extraction of coal bed methane is known in the prior art and generally, to extract methane, a steel encased hole is drilled into the coal seam of less than 300 to over 4,920 feet below the surface of the ground. As the pressure within the coal seam declines due to pumping of water from the coalbed, both gas and water can surface through the pump tubing. More commonly, formation water is extracted through the tubing and the isolated coal bed methane gas travels upwardly from the casing of the wellbore and is collected at the surface. The gas is generally sent to a compressor station and into natural gas pipelines. The formation or produced water is either reinjected into isolated wells, or if it does not contain contaminants, released into streams, used for irrigation, or sent to evaporation ponds. The formation water typically contains dissolved solids such as sodium bicarbonate and chloride but its chemistry will vary depending upon the geographic location of the well.

The production of coal bed methane from formations is typically characterized by a negative decline in which the gas production rate initially increases as the water is pumped off and gas begins to desorb and flow. Desorption is the process by which coals free methane when the hydrostatic pressure in the coal formation is reduced. The methane desorption process follows a curve (of gas content vs. reservoir pressure) called a Langmuir isotherm. The isotherm can be defined by a maximum gas content (at infinite pressure), and the pressure at which half that gas exists within the coal. These parameters (called the Langmuir volume and Langmuir pressure, respectively) are properties of the coal, and vary widely depending upon the physical and chemical characteristics of the coal and the geographic location. As production occurs from a coal reservoir, the changes in pressure are believed to cause changes in the porosity and permeability of the coal. This is commonly known as matrix shrinkage/swelling.

About 20% of natural gas resources (biogenic gas) are produced by microorganisms living in various subsurface reservoirs/aquifers comprised of several different rock types (i.e. coal, shale, limestone & sandstone as examples). It is known that certain bacteria assemblages initiate methanogenesis resulting in the production of methane gas. Until recently, coal bed methane was thought to have formed millions of years ago when the coal itself was being formed. However, recent scientific discoveries suggest that much of the gas was generated by anaerobic microbial systems within the coal seams long after the initial process of coalification. This type of natural gas, referred to as biogenic natural gas, relies on the active biological conversion of organic nutrients from waters found in the coal and terrestrial sources into methane.

It is well known in the prior art to add amendments for the stimulation of biogenic gas generation in deposits of subsurface reservoirs/aquifers hosting assemblages of methanogenic bacteria. Once access is gained to the subsurface reservoir/aquifer, amendment(s) are added to the formation fluids by directly pouring, introducing or spraying the nutrient into the access point for stimulating methanogenic activity in the formation. As a result of the highly variable nature of these reservoir properties, 1) the coal's physical properties, 2) the coal's formation waters chemistry and 3) the distribution of the methanogenic biota, the amendment(s) may include all or only some of the following; nutrients or Food Grade Carbohydrates (FGCs); Bio-augmentation of methanogens; and an oxidizing agent. Once the formation fluids are treated with the amendment(s), the composition is incubated for a period of time during which the biogenic gas is generated and then may be removed from the well formation.

For example, the current method provides food grade carbohydrates, such as sucrose, fructose and glucose and more specifically, sugar molasses and corn extract or corn syrup to boost microbial populations within the formation and then removing biogenic methane from the coal bed formation without de-watering the coals. This is accomplished using a specialized isolation tool that provides for continuous recovery of coal bed methane from coal bed methane formations without releasing or removing formation water. The current method allows for the bacteria's habitat to remain intact, unlike the traditional methane production from coal that is dependent on de-watering the coals. Further, the current method results in the production of biogenic methane without burning the energy required to extract and dispose of formation water. As a result, this lowers the Carbon Index (CI) of the current method to the point where the farmed methane may qualify for carbon credits. Further, use of this method also maintains the favorable water habitat for the methanogenic bacteria that produce the methane, so that continuous recovery of methane is also possible.

The current methods utilize microorganism assemblages that convert complex organic molecules in coal and shale to natural gas (methane). One proposed method of methanogenesis is to stimulate the production of methane through the introduction of glucose or any form of sugar to cause biostimulation of the methanogenic microorganisms. In accordance with the disclosure, there is provided a method of methanogenesis by stimulating the production of methane through the introduction of food grade carbohydrates to cause biostimulation of the methanogenic microorganisms. Removal of the methane is accomplished without removing formation waters. Specifically, there are provided methods of separating methane from formation rock types and formation water in a gas producing well, the steps comprising selecting a food grade carbohydrate as a nutrient amendment, diluting the food grade carbohydrate with formation water, depositing via gravitational forces the dilute mixture into wellbore tubing, exposing assemblages of microorganisms within the well to the dilute mixture, incubating the mixture and the microorganisms for a pre-determined period of time, introducing an isolation tool within the wellbore, the isolation tool having connected first and second separator sections each having internal cavities, directing reservoir fluid upwardly into the second separator section of the isolation tool and limiting flow of solids into the second section with spaced perforations on the second separator section, limiting the passage of formation fluid through a hydrophobic sleeve member, allowing passage of gas through the sleeve member, a mesh member and a perforated tool insert and into an annulus of the tool insert, gathering isolated gas into transport tubing for passage into surface gas gathering pipelines, and maintaining formation fluid within the well. The tool may also include a bypass gas transport may have a protective casing, hydrophobic member and at least one centralizer.

DETAILED DESCRIPTION

There is provided a method of recovering biogenic biostimulated methane from subsurface coal formations. As set forth above, methanogenic bacteria may be stimulated to increase methane production through the use of nutrients. In a preferred form, methanogenic bacteria present in subsurface formations are stimulated through exposure to food grade carbohydrates (FGC's). FGC's represent a wide range of substances including dextrose, lactose, invert sugar, starch hydrolysates, sucrose, glucose, fructose, malt syrup, molasses and corn syrup. Examples of other FGC's that may be used are mannose, galactose, cellobiose, xylose and arabinose. A preferred form of FGC is sugar molasses. Sugar molasses, a very inexpensive by-product of sugar generation from sugar beets, and corn syrup, another very inexpensive by-product from corn ethanol are the two main FGCs for use in enhancing or stimulating methane production by microorganisms. These are listed by way of example and not limitation.

In both the lab and in the field, FGCs were added to native northeastern Wyoming coal. These coalbeds also act as a potable water aquifer that provide the habitat for the anaerobic bacteria assemblages that produce methane (CH4 or Coal Bed Methane, CBM), as well as CO2. The coals naturally have a high affinity to adsorb CO2 and CH4, but preferentially adsorb the CO2. Bacteria will reproduce (double in population) every 20 to 30 minutes and continue to reproduce/increase in population if an unlimited food source is available. It is likely the methanogenic bacteria consume organic nutrients that are intermittently 'flushed' thru the coal aquifers.

EXAMPLE

Figure 12:
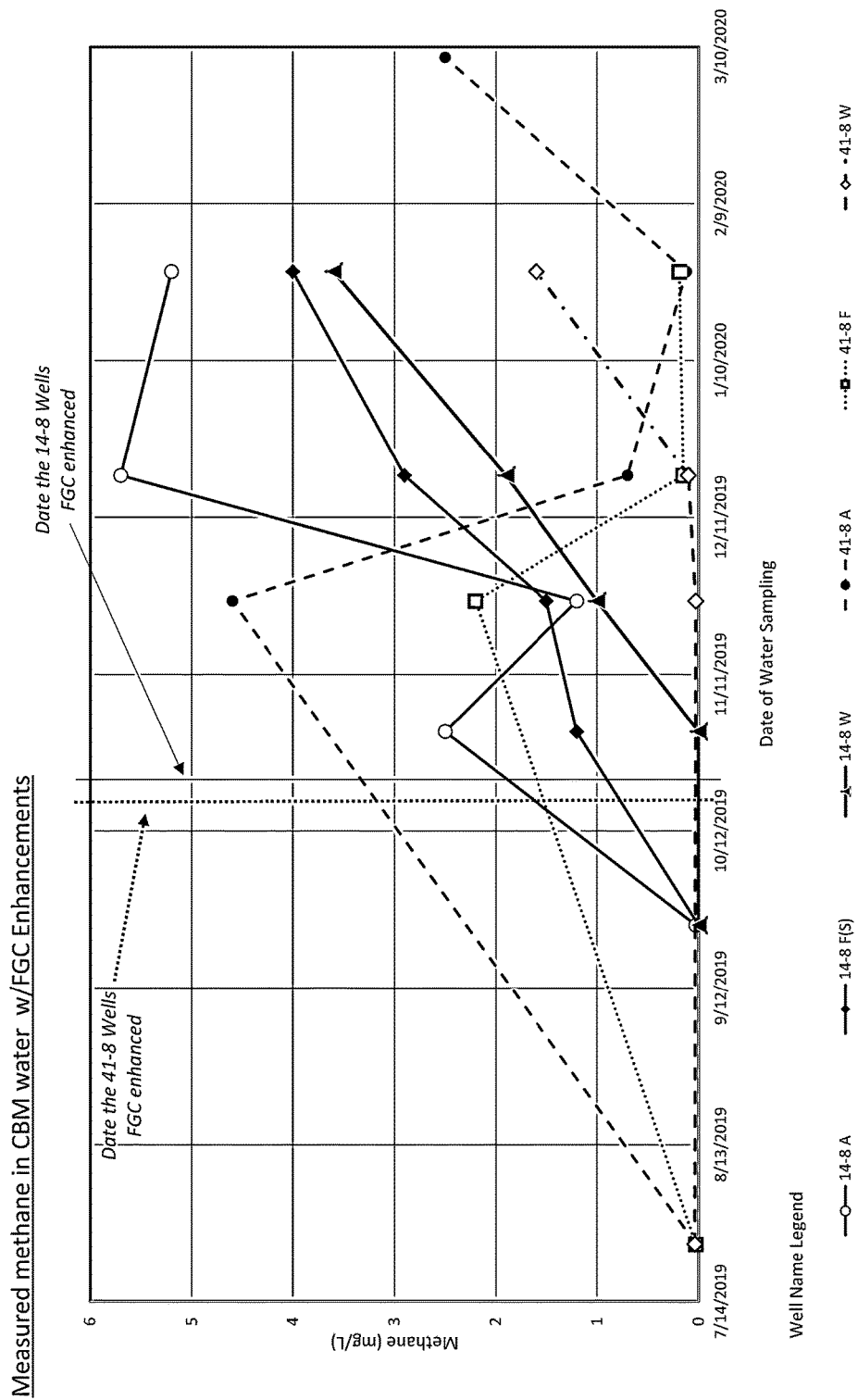
FIG. 12 is a graph of demonstrating the measured methane in coal bed methane water with FGC enhancement.

Food Grade Carbohydrates (FGCs) were gravity fed into 6 separate CBM wells each of which was completed in a separate coal seam. The wells were then shut in. Water samples were collected prior to FGC enhancements (baseline sample), and also taken roughly once a month after enhancement. All water samples were analyzed, to determine if there was degradation to the coal aquifers potable water or a change in methane generation. The graph in FIG. 12 depicts the increase in methane generation seen from this field trial. All wells with 41-8 in the well name were treated with FGC corn extract, whereas wells with 14-8 in the well name were treated with FGC sugar molasses.

The results of this field trial are clear, sugar molasses was a better food source for the methanogenic bacteria. Also tested was a mixture of sugar molasses with corn syrup in the lab, and it too was also successful as an FGC. From a visual analysis of the water samples removed from the wellbore, sugar molasses seems to dissipate in the wellbore much faster for greater diffusion into the subsurface formations.

In one aspect of the present method, a pre-determined quantity of FGC's is sourced with a range of about 7500 gallons of sugar molasses and 750 gallons of corn syrup per well, or a total of 8,250 gallons of FGC (in this example for a 30 to 35 foot thick reservoir/aquifer). Different quantities and forms of FGC's may be used without departing from the scope of the disclosure. The FGC's are transported and preferably, the FGC-sugar molasses is split between three to four 400 barrel tanks on location (for example ~62.5 bbls of the mixed FGCs in each 400 bbl tank). The 400 barrel tanks are then filled with formation water (at least ~135 bbls formation water in each tank). A mixed solution of 33% FGC and 67% formation water at a volume of 750 gallons per foot of reservoir may be used. For example purposes only, for a bed of 20 foot thick coal, the mixed enhancement solution of 15,000 gallons would be used, for a 10' thick coal bed, 7500 gallons would be used and for a 50' thick coal bed, 37,500 gallons would be used. In another form, approximately 1350 gallons (30-31 bbls) of FGC-corn extract may be added in each tank. For example, the injected mixture will roughly be 32% FGC-sugar molasses; 16% FGC-corn extract and 52% formation water.

The mixture is then gravity fed into the wellbore through tubing. Once the mixture is absorbed into the wellbore and the level of the mixture in the tubing drops, additional mixture may be added through the tubing. Following injections of the FGC's into the well, the tubing T may be flushed with approximately ~20 bbl of a 1% or less Hydrogen peroxide ($H_2O_2$). Generally, the well is then shut in and incubated for thirty to sixty days allowing the microorganisms to metabolize the FGCs and produce renewable methane, also known as renewable natural gas.

Once the incubation period has ended, the wells may be opened up and an isolation tool is inserted into the wellbore for gas removal. Using the isolation tool, to be described in further detail, is a critical component to producing methane generated by bacteria living in subsurface coal seams. Once the coals have been exposed to the FGC's, and after waiting a specified period of time, a modified tool is inserted into the wellbore to extract the methane, The tool allows for the bacteria's habitat to remain intact unlike the traditional methane production and extraction from coal that is dependent on de-watering the coals. The tool allows the production of 'farmed methane' without removing any coal bed methane water as keeping the coal bed methane water downhole is critical as it is the main component of the methanogenic bacteria's habitat.

Figure 1:
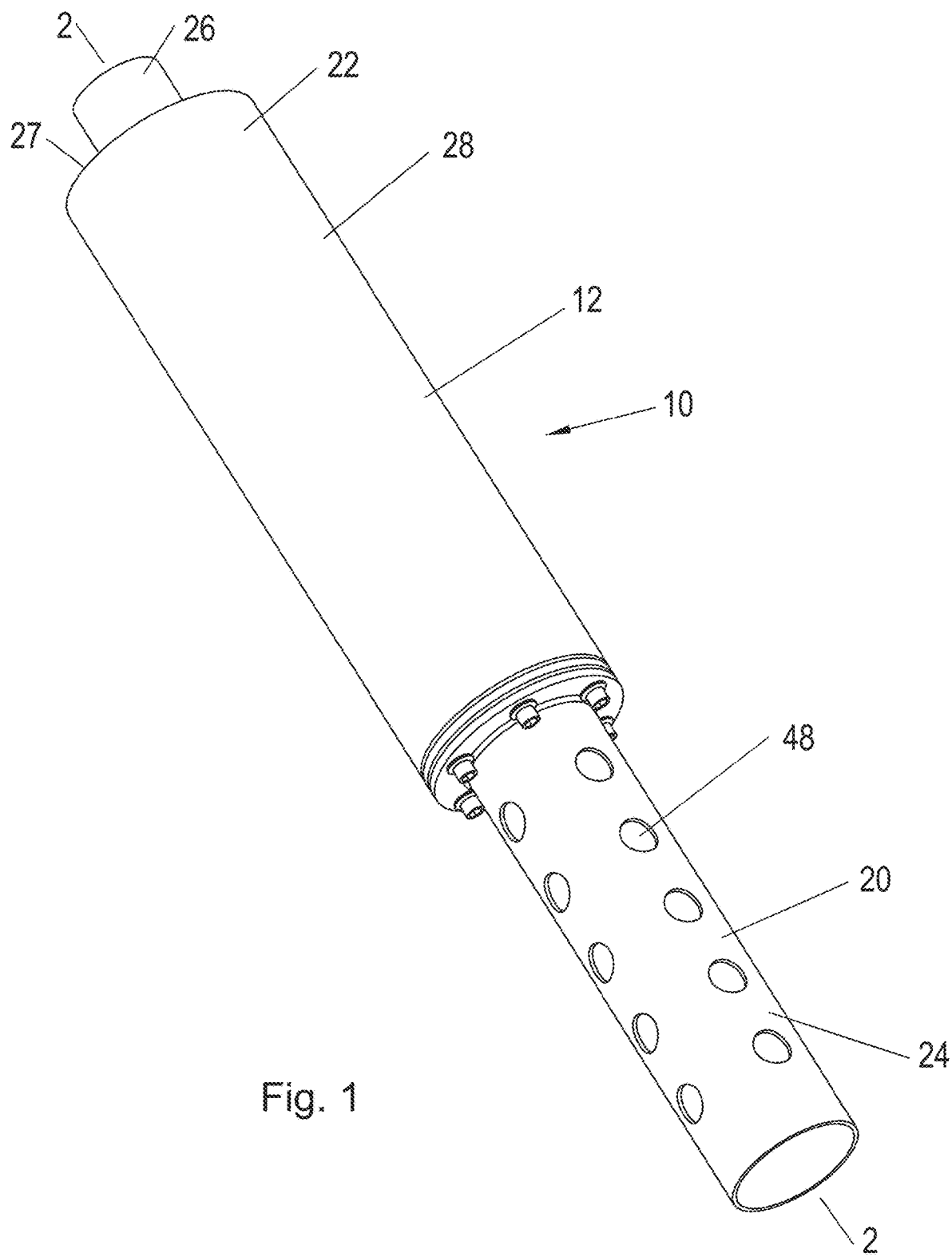
FIG. 1 is a perspective view of a downhole gas recovery tool.
Figure 2:
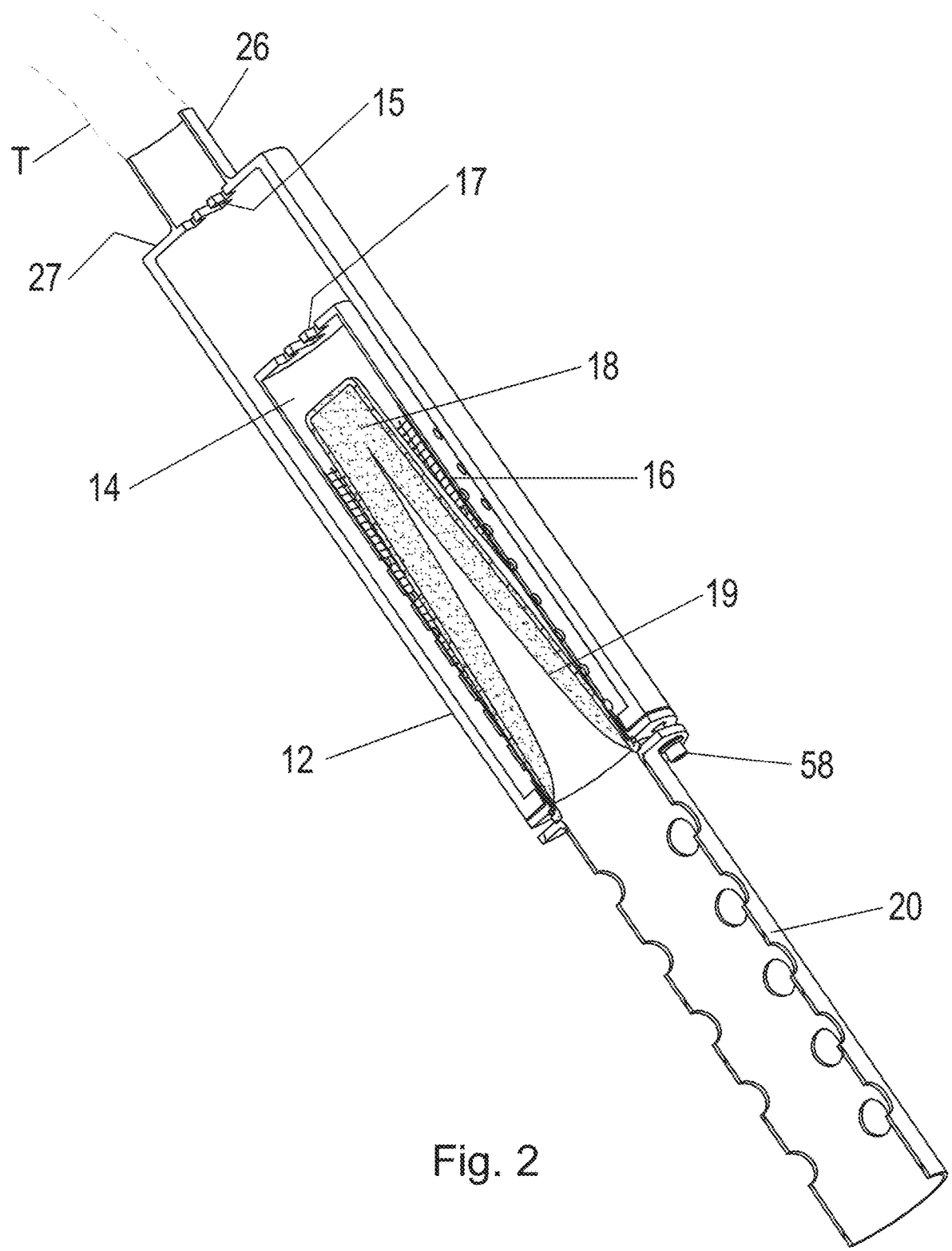
FIG. 2 is a sectional view about lines 2-2 of FIG. 1.
Figure 3:
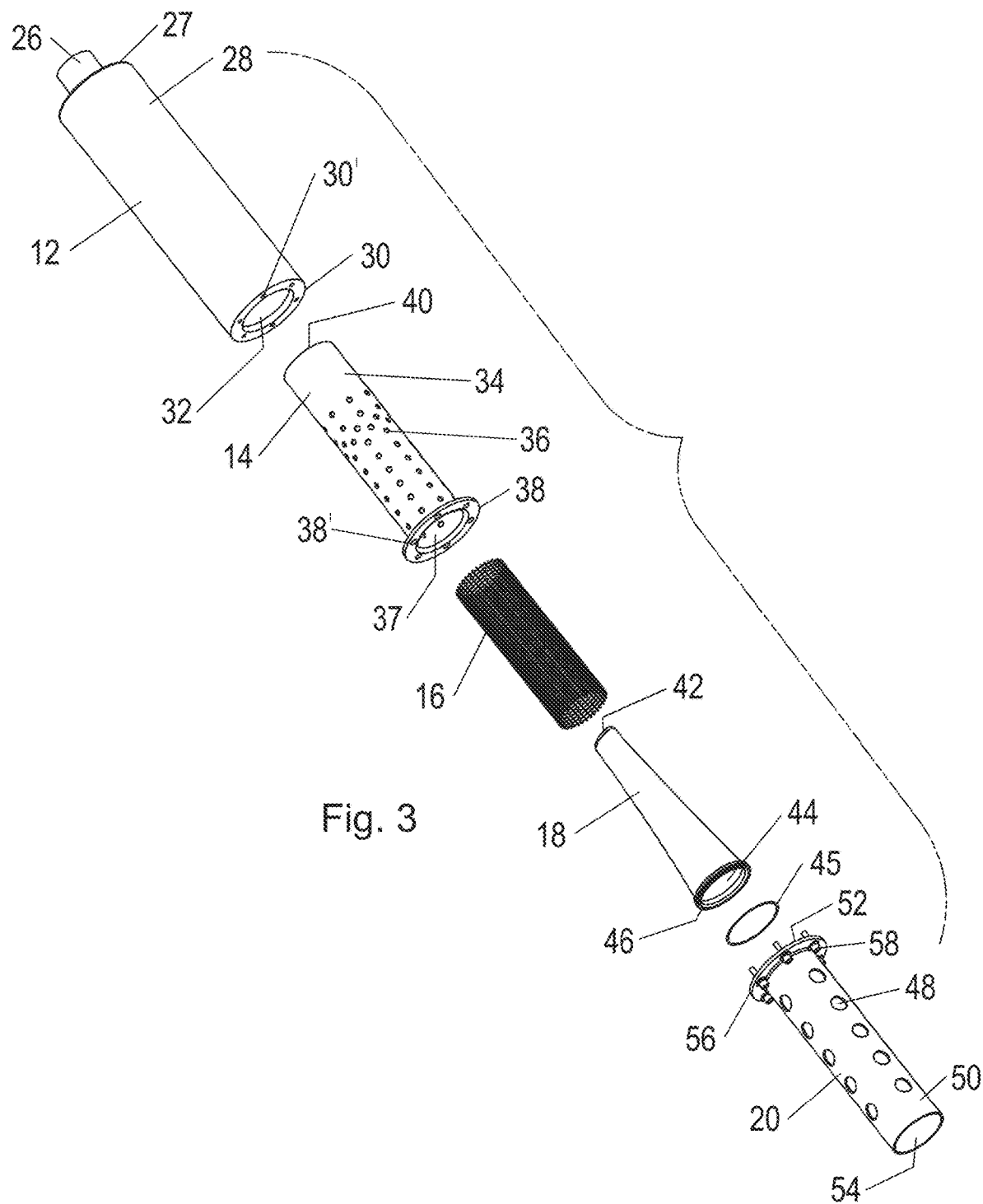
FIG. 3 is an exploded view of FIG. 1
Figure 4:
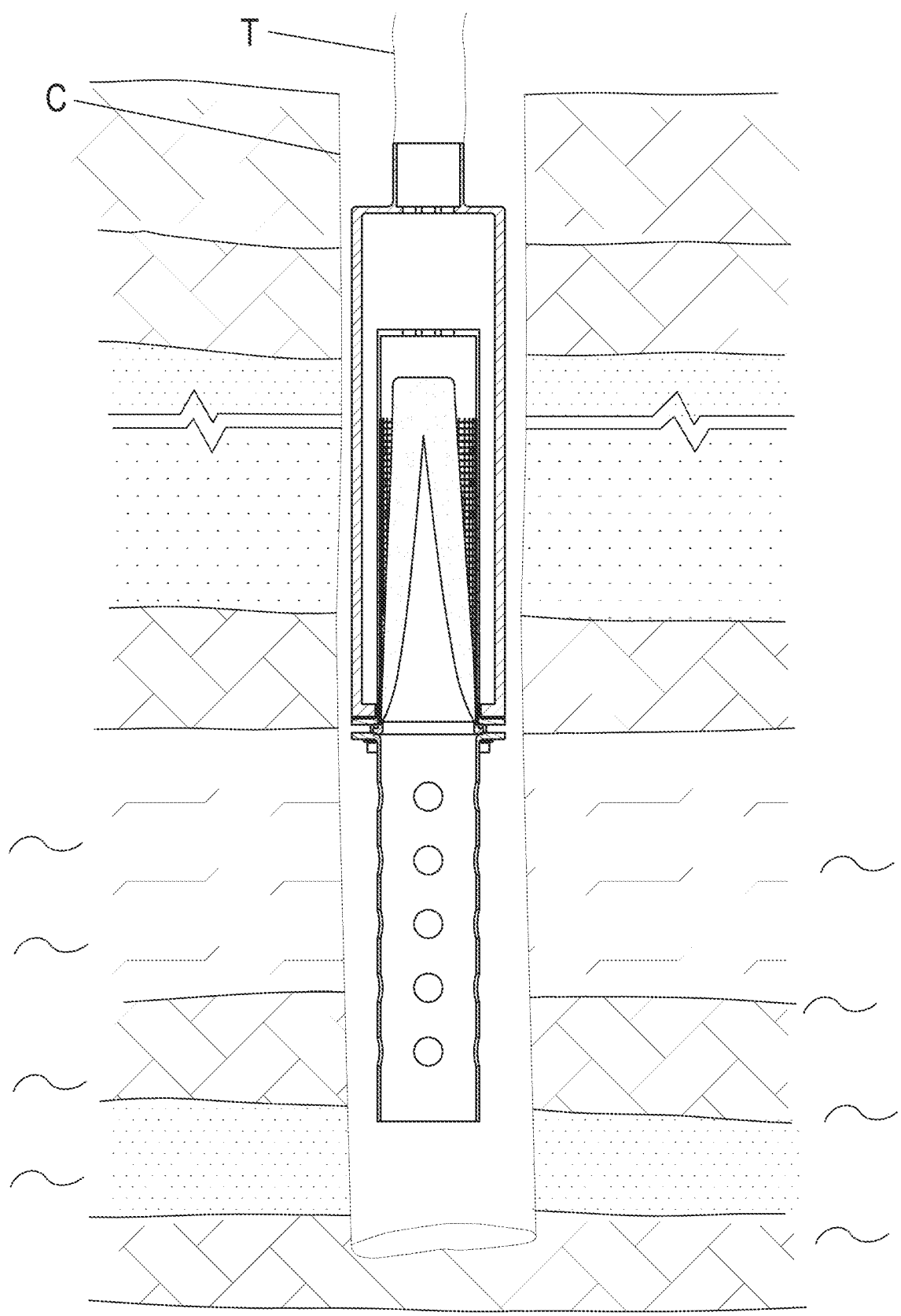
FIG. 4 is a sectional view as shown in FIG. 2 including a sectional view of a gas producing formation.
Figure 5:
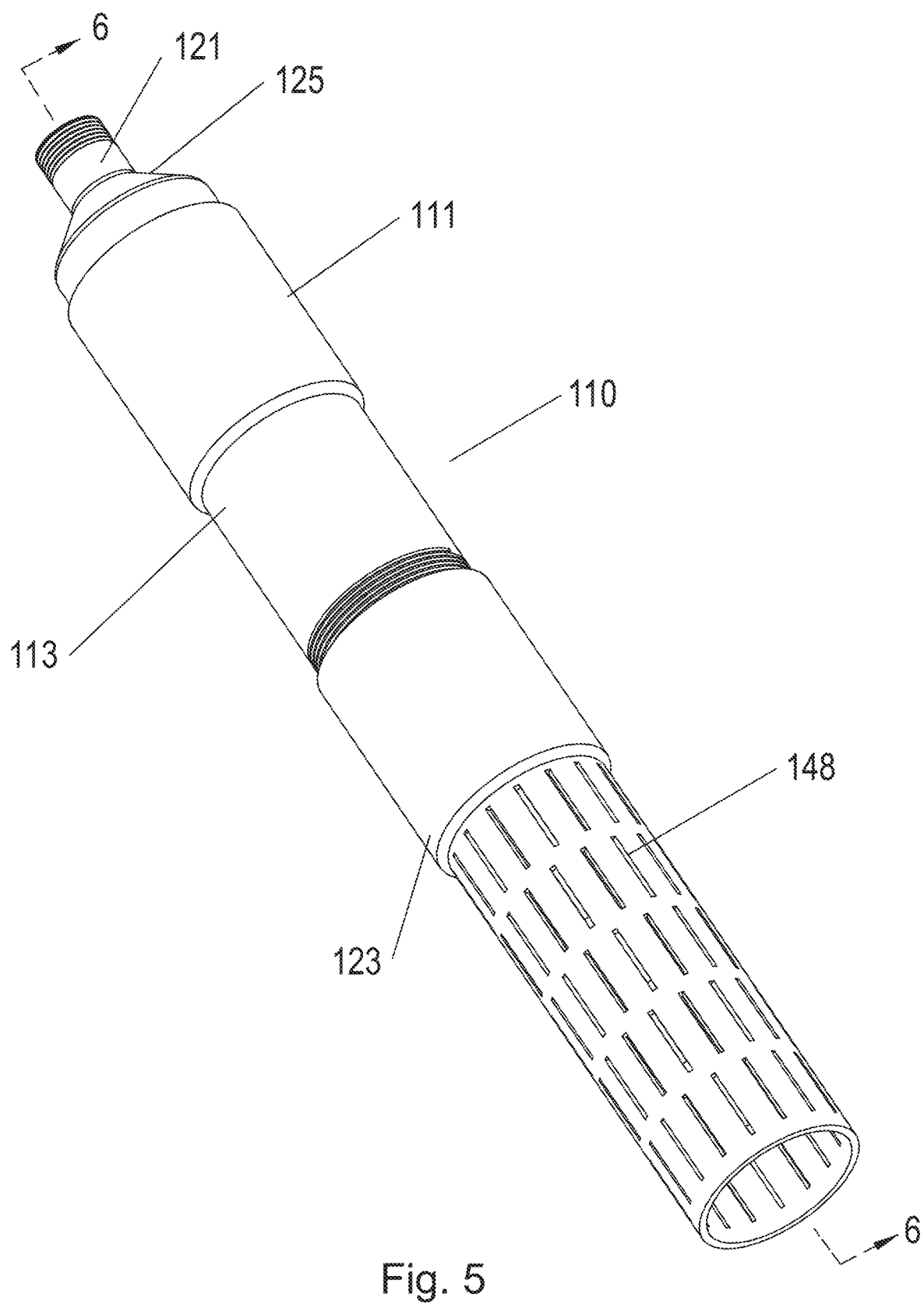
FIG. 5 is a perspective view of a second form of downhole gas recovery tool.
Figure 6:
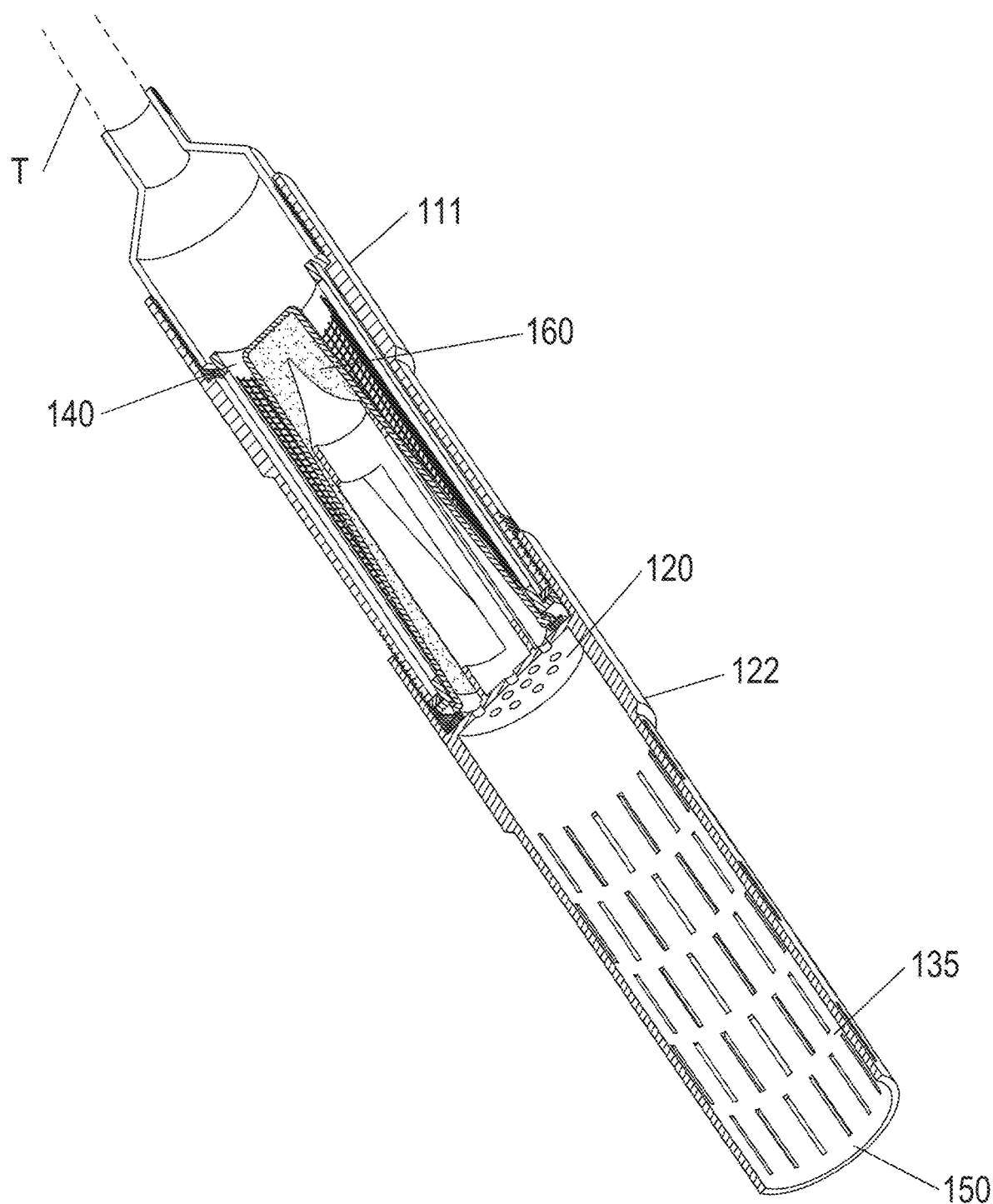
FIG. 6 is a perspective sectional view about lines 6-6 of FIG. 5.
Figure 7:
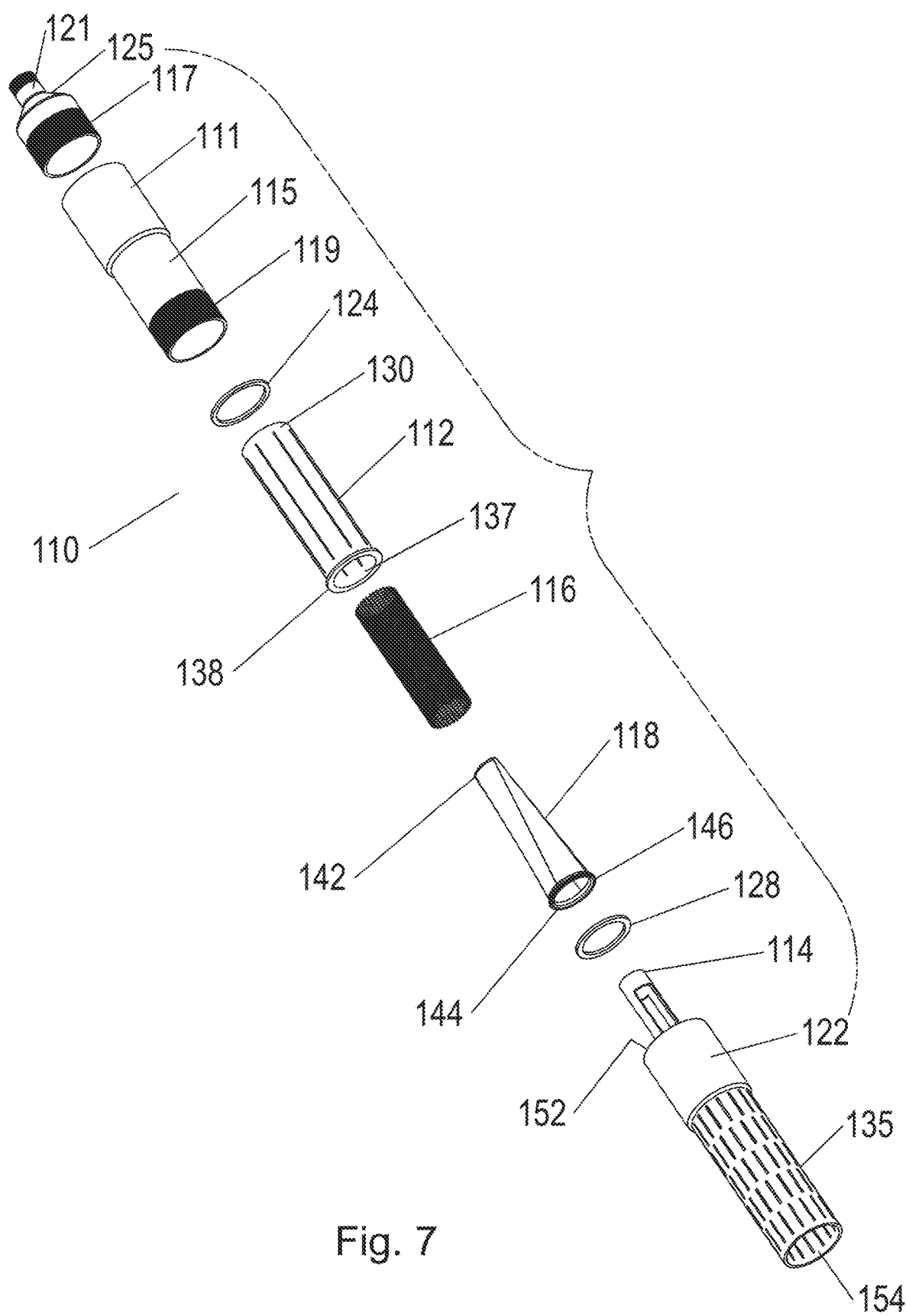
FIG. 7 is an exploded view of FIG. 5.
Figure 8:
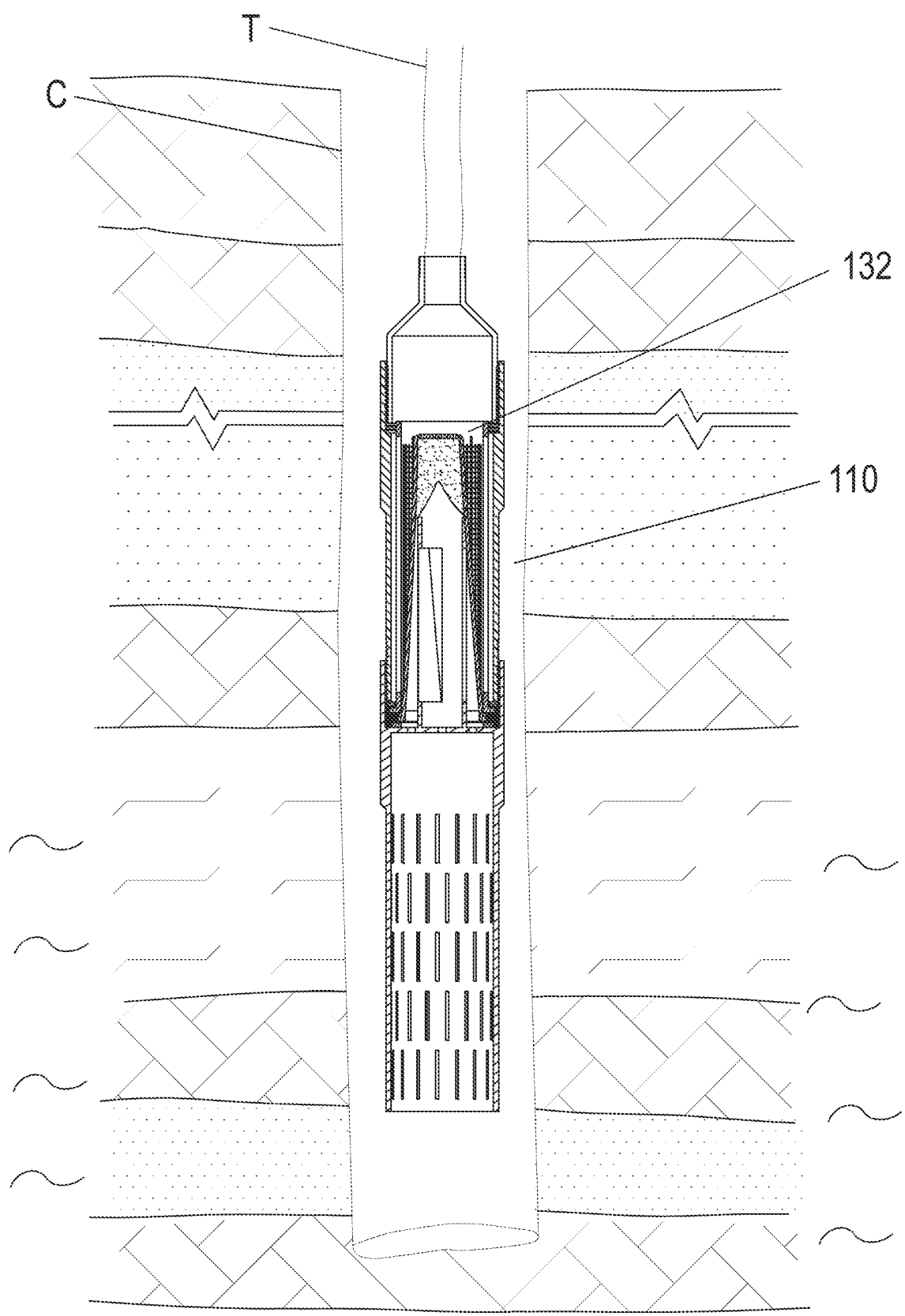
FIG. 8 is a sectional view as shown in FIG. 6 including a sectional view of a gas producing formation.

A passive downhole isolation device 10, 110, 210' and 310 for removal of the farmed methane, is provided and shown in FIGS. 1-11. More specifically, as shown in FIG. 3, the device 10 has an external circumferential housing 11, a cylindrical internal tool insert 14, a wire mesh cage 16, a hydrophobic sleeve member 18 and a perforated bore tail 20. The downhole isolation tool is designed to be positioned within a cased well bore C as shown in FIG. 4. The isolation tool preferably comprises upper and lower isolation sections 22 and 24, as shown in FIG. 1, with the upper isolation section 22 defined by the housing 12 made up of an interior tool annulus 32 that is designed to house the internal tool insert 14. The housing 12, perforated tool insert 14 and bore tail 20 are all preferably made up of non-corrosive steel, aluminum, polypipe, plastic or other suitable material.

As shown in FIGS. 1, 2, 4 and 5, the upper section 22 includes the external housing 12 which is of cylindrical configuration having an upper neck coupling 26, a top plate or collar 27, cylindrical walls 28, a lower base rim 30 and internal cavity or annulus 32. The top plate 27 is circumferentially positioned around the neck coupling 26. The coupling 26 is designed to be positioned below the static water level in the wellbore by various amounts depending on the reservoir characteristics of the gas bearing formation and allows gas to flow up the tubing T to gathering and sales pipelines (not shown). The tubing T is threaded into the neck coupling 26, which is securely welded on to the top of plate 27. The top plate 27 forms a part of the upper section 22 which is positioned below the static water level within the wellbore. The internal tool annulus 32 and the base rim 30 of the upper section 22 are sized to accommodate the perforated tool insert 14. The tool insert 14 is defined by cylindrical walls of non-corrosive steel, aluminum, polypipe, plastic or other suitable material any size diameter from 2" to over several feet as long as it will fit into upper section 22 having circumferentially aligned, radially spaced perforations 36, preferably along a lower mid-portion of the tool insert 14, an internal cavity 37, an outwardly extending rim member 38 having an opposite open end 40 from the rim member 38. A mesh wire screen cage 16 may be inserted within the internal cavity 37 to line the interior cylindrical walls in touching relation to the perforations 36. The mesh screen is preferably 10 mesh, stainless steel but can be of different composition and still be within the scope of this disclosure.

The hydrophobic sleeve member 18 includes a cylindrical rim member 46 that maintains the position of the sleeve member within the tool insert 14. The tool insert 14 also includes a flat or O-ring 45 positioned between the rim member 46 and the bore tail 20 to ensure a tight connection between the upper and lower sections 22 and 24 as shown in FIG. 4A. The sleeve member is preferably made up of hydrophobic material having a single open end 44, closed end 42, and the cylindrical rim member 46 for support. The preferred material for the sleeve member 18 is polypropylene but may be comprised of any other hydrophobic fibers such as polyester, nylon, or polypropylene. These fibers may be in the form of staple yarns, flat continuous multi-filaments, or texturized continuous multi-filaments. The hydrophobic nature of the sleeve may also be accomplished using hydrophobic and super hydrophobic coatings such as polymethylhydrosiloxane (PMHS) and polyvinyl chloride (PVC), as an example. The sleeve member is preferably of 1 micron pore size but may also be in the range of 0.6 to 1.1 micron pore size to allow for passage of vaporized gas. The sleeve member 18 is inserted into the cavity 37 of tool insert 14 with the mesh screen 16 located therebetween. The placement of the mesh wire screen 16 between the interior of the tool insert 14 and the sleeve member 18 prevents the sleeve member 18 from passing through the perforations 36. The mesh wire screen 16 preferably lines up with the perforations 36 on the tool insert 14.

The bore tail 20 is of cylindrical configuration with circumferential perforations 48 in the wall 50 and also having dual openings 52, 54 and acts as a solid separation tool. The perforations 48 are sized to allow passage of liquid therethrough but prevent passage of large solids into internal opening or cavity 54. Upper opening 52 has an outwardly extending rim 56 that is designed to correspond with rim member 38 and rim member 30 for secured engagement using upwardly extending threaded bolts 58. The bolts are designed to pass through bolt openings 38' and 30' thereby securing the upper and lower sections together and retaining the sleeve member 18 in place. The dimensional length of each portion of the tool is designed to allow fluid to travel the length of the lower and upper sections to allow for separation of the gas from the production fluid. Preferably, the upper and lower sections 22 and 24 are of roughly the same length but variations in dimensions are possible without departing from the scope of the disclosure.

In use, the tool 10 is set below the static water level in the wellbore. The depth below the static fluid level the tool is positioned varies depending on the characteristics of the gas reservoir, as a general rule the closer the tool is set to the gas bearing formation, the better. The lower section 24 of the tool 10 receives gas combined with formation liquid from the well reservoir through the encased well bore. The bore tail 20 restricts large solids from entering the bore tail passageway 54 due to the restrictive perforations 48. A mixture of gas and liquid is generated within the bore tail 20 with the pressure forcing the mixture into the upper section 22 of the tool 10.

For example, if the tool is set one hundred feet below the static fluid level, this creates a hydrostatic pressure of approximately 43 psi at this depth under fresh (non-salt) water. The tubing T and tool annulus 32 are isolated from the approximately 43 psi of hydrostatic pressure by the hydrophobic sleeve membrane 18. The tubing pressure (and pipeline pressure) are preferably maintained at 5 psi to 20 psi. This creates a pressure sink inside the annulus 32 of the difference between the approximately 43 psi hydrostatic head and pressure inside the tool annulus 32; tubing T and the surface gas pipelines (not shown). For example, if the tubing T pressure is 10 psi, the pressure differential is 33 psi ((43 psi (hydrostatic head)-10 psi (tubing T pressure)). The side 19 of the hydrophobic membrane in contact with the formation water (opposite the wire mesh) is set at a depth in the wellbore such that the hydrostatic pressure at that depth is greater than the pressure on the side of the hydrophobic membrane that is in contact with the wire mesh 16 and insert tool 14 and consequently the annulus 32 that is in communication with the tubing T up to the surface.

By its very nature, gas will flow towards a point of lowest pressure in the wellbore. The gas dissolved in the coal (or other rock type) formation or production water will flow towards the pressure sink and be liberated from the fluid or water within the interior 47 of the sleeve member 18, pass thru the hydrophobic membrane 18, the mesh cage 16, the tool insert perforations 36 and into the tool annulus 32. The liberated gas then travels upwardly through tool insert passageway 17, upper passageway 15 and up the tubing T into the gas gathering pipeline. Formation fluid or water remains within the interior 47 and generally is not forced upwardly into the tubing T due to the hydrophobic sleeve 18.

A second form of passive downhole isolation device 110 is provided and shown in FIGS. 5-8. More specifically, the device 110 has an upper section of the tool 113 with an external housing 111 which is of cylindrical configuration having an upper neck coupling 121, collar 125, lower threads 117. The housing 111 includes interior threads for engagement with lower threads 117, exterior housing 111, a circumferential housing 115, an aluminum or steel compression ring 124, a perforated cylindrical internal tool insert 112 with a steel compression ring 138, a wire mesh screen 116, a hydrophobic sleeve member 118 with an aluminum flange ring 146, an aluminum separator seal locking ring 128, a gas/water internal separator support 114, a perforated baffle plate 120, a slip collar 122, and a bore tail 135. This form consists of a break down tool that may be assembled to a length of at least 2' to 40' or longer. The components are of shorter length to provide for easy manufacturing, transport and assembly on site. The components are also easily disassembled with a multitude of threaded members. The threaded members are an alternative to use of bolts and other securing mechanisms that may easily fail or corrode over time. The extended length provides additional surface area for gas/water separation allowing for a more efficient separation.

The downhole isolation tool 110 is designed to be positioned within a cased well bore C as shown in FIG. 4 and described above. The isolation tool preferably comprises the exterior housing 111 that is made up of 2' to several feet in diameter steel or other non-corrosive material, ranging in length from 2 feet and up to 40 feet and beyond depending upon the diameter of the wellbore and reservoir characteristics of the gas bearing formations. An upper section of the tool 113 has the external housing 111 which is of cylindrical configuration having the upper neck coupling 121, collar 125, lower threads 117, the housing 111 includes interior threads for engagement with lower threads 117, cylindrical wall housing 115 with exterior threading 119 is designed to house interior gas separation elements. The upper section 113 as well as lower section 123 are preferably made up of non-corrosive steel or aluminum.

The upper section 113 includes an internal cavity or annulus 132. The collar 125 is circumferentially positioned around the neck coupling 121. The coupling 121 is designed to be positioned below the static water level in the wellbore and allows gas to flow up the tubing T to gathering and sales pipelines (not shown). The tubing T is threaded into the neck coupling 121. The internal tool annulus 132 and the housing 115 are sized to accommodate the perforated tool insert 112. The tool insert 112 is defined by cylindrical walls of 4" aluminum having circumferentially aligned, radially spaced perforations 130, preferably along the entire length of the tool insert, an internal cavity 137 and an outwardly extending rim member 138 having an opposite open end 140 from the rim member 138.

One end of the housing 115 has internal threads for connection to the housing 111 and neck coupling 121 and lower threaded members 119 for threaded attachment to lower collar 122. The exterior housing is designed to house section 112, as shown in FIG. 12, with the upper isolation insert 112 defined by a longitudinally slotted circumferential housing having perforations 130 at radially spaced intervals.

The perforations or slots are preferably ⅛", and 20¾" length at 45 degrees of one another, depending upon the length of the tool. The isolation insert 112 is non-corrosive steel, aluminum, polypipe, plastic or other suitable material, with any size diameter from 2" to over several feet as long as it will fit into housing 115 but this may vary depending upon the desired length of the tool 110. The slots aid in gas separation as well as water/solid separation. A stainless-steel screen 116, matching the length and interior circumference is inserted in touching relation within the interior of the isolation section 112. The screen cage 116 may be inserted within the internal cavity 137 to line the interior cylindrical walls in touching relation to the perforations 130. The mesh screen is preferably 10 mesh, stainless steel but can be of different composition and still be within the scope of this disclosure.

Figure 11:
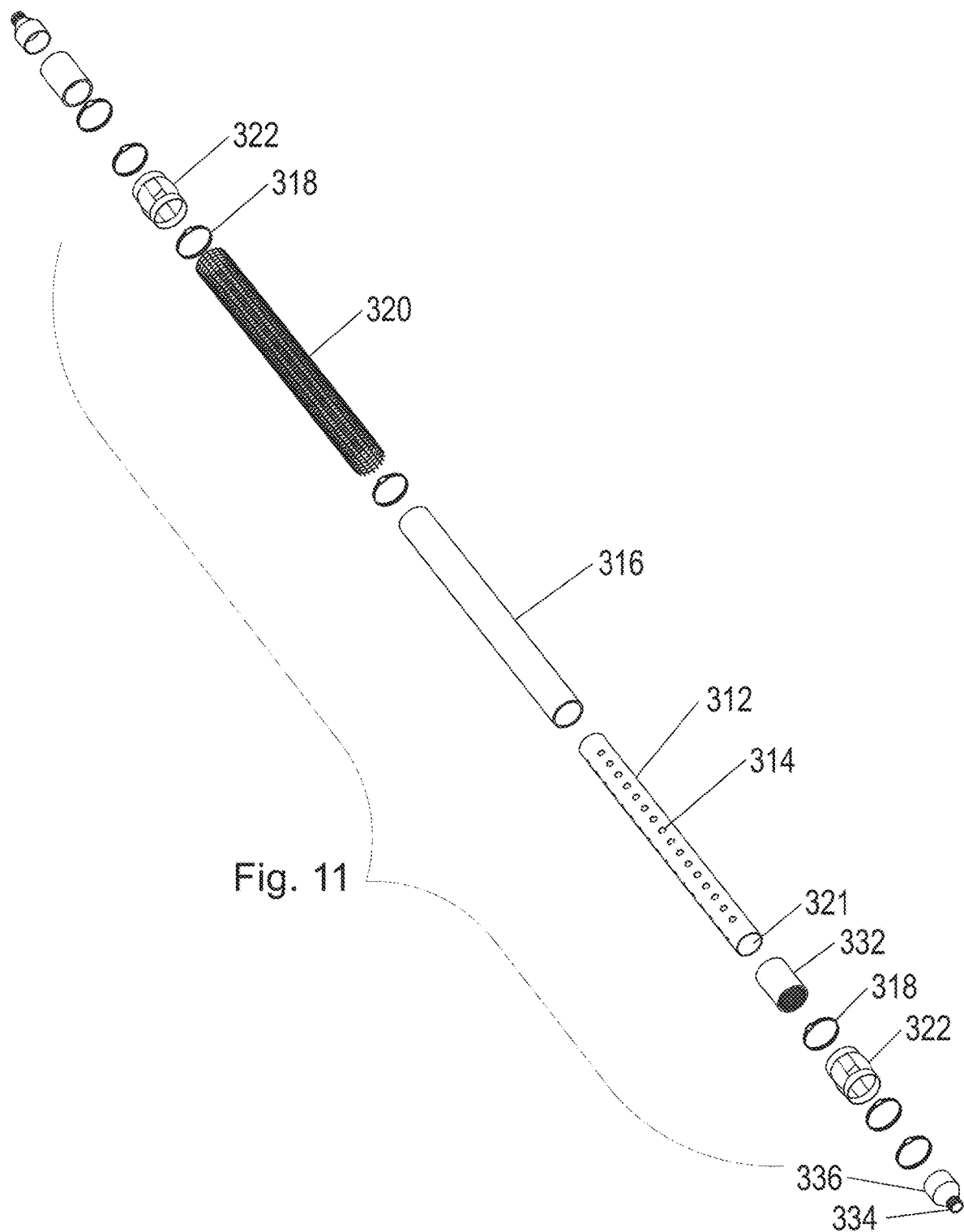
FIG. 11 is an exploded view of a fourth form of gas recovery tool.

A gas/water internal separator support 114 comprising any size from 1" up to several feet in diameter as long as it will fit inside the hydrophobic sleeve 118 and then inside of isolation section 112. Slots are cut every 10 to 60 degrees and are at least or greater than 50% of the total length of 112. The separator support shell 114 is secured, preferably welded, to a baffle plate 120 that is welded to the slip collar 122. The baffle plate 120 has radially aligned perforations that aid in gas/water separation as well as blocking of large debris from passing therethrough. The slip collar 122 has internal threads (not shown) for threaded engagement with the housing 115, as described above. A gas/water hydrophobic sleeve 118 is placed over the support shell 114, the support shell 114 providing interior support for the separation tool/sleeve 118 and preventing it from collapsing within the isolation tool 112. The separation tool 118 includes a cylindrical rim member 146 that maintains the position of the sleeve member within the tool 110. The tool insert 112 in conjunction with steel compression rim ring 138, aluminum or steel compression ring 124, flange ring 146 and aluminum locking ring 128 ensure a tight connection within the tool as shown in FIGS. 11 and 11A. The sleeve member 118 is preferably made up of hydrophobic material having a single open end 144, closed end 142, and the cylindrical rim member 146 for lower support. The preferred material for the sleeve member 118 is polypropylene but may be comprised of any other hydrophobic fibers such as polyester, nylon, or polypropylene. These fibers may be in the form of staple yarns, flat continuous multi-filaments, or texturized continuous multi-filaments. The hydrophobic nature of the sleeve may also be accomplished using hydrophobic and super hydrophobic coatings such as polymethylhydrosiloxane (PMHS) and polyvinyl chloride (PVC), as an example. The sleeve member is preferably of 1 micron pore size but may also be in the range of 0.6 to 1.1 micron pore size to allow for passage of vaporized gas. The sleeve member 118 is inserted into the cavity 137 of tool insert 112 with the mesh screen 116 located therebetween. The placement of the mesh wire screen 116 between the interior of the tool insert 112 and the sleeve member 118 prevents the sleeve member 118 from passing through the perforations 130.

The bore tail 135 is of cylindrical configuration with circumferential perforations 148 in cylindrical wall 150 and also having dual openings 152, 154, acting as a solid separation tool. The perforations 148 are sized to allow passage of liquid therethrough but prevent passage of large solids into internal opening or cavity 154. The dimensional length of each portion of the tool is designed to allow fluid to travel the length of the lower and upper sections to allow for separation of the gas from the production fluid. Preferably, the upper and lower sections 113, 123 are of roughly the same length but variations in dimensions are possible without departing from the scope of the disclosure. Additional forms, shown in FIGS. 15 and 16, demonstrate use of multiple linking tools for use in a single formation.

In use, the tool 110 may be transported as separate parts and assembled on-site and set below the static water level in the wellbore. Due to the potential length of the tool, it may be more cost effective and easier to assemble on site. The lower section 123 of the tool 110 receives gas combined with formation liquid from the well reservoir through the encased well bore. The bore tail 135 restricts large solids from entering the bore tail passageway 154 due to the restrictive perforations 148. A mixture of gas and liquid is generated within the bore tail 135 with the pressure forcing the mixture through the baffle plate 120 and into the upper section 113 of the tool 110.

Figure 9:
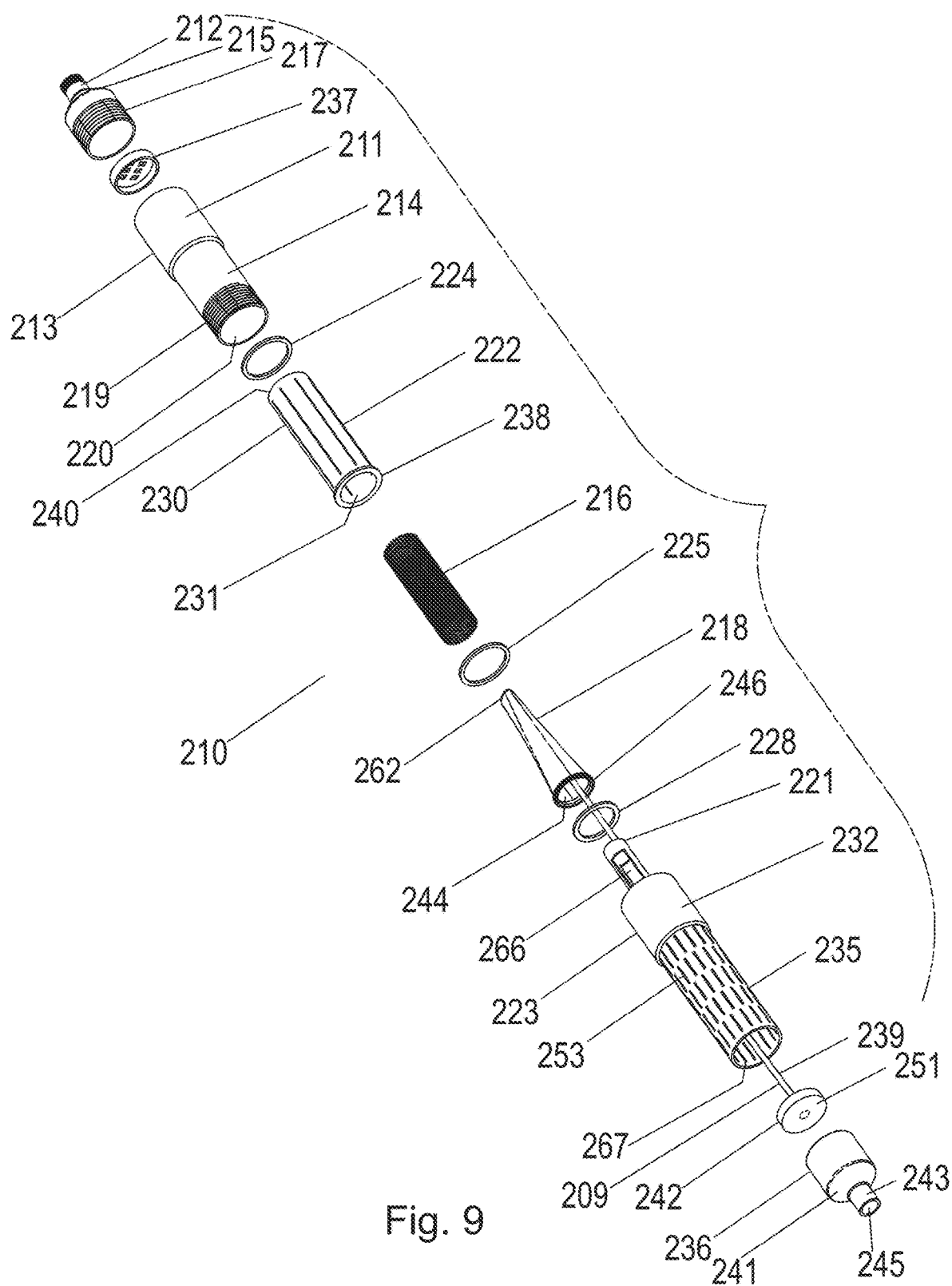
FIG. 9 is an exploded view of a third form of gas recovery tool.
Figure 10:
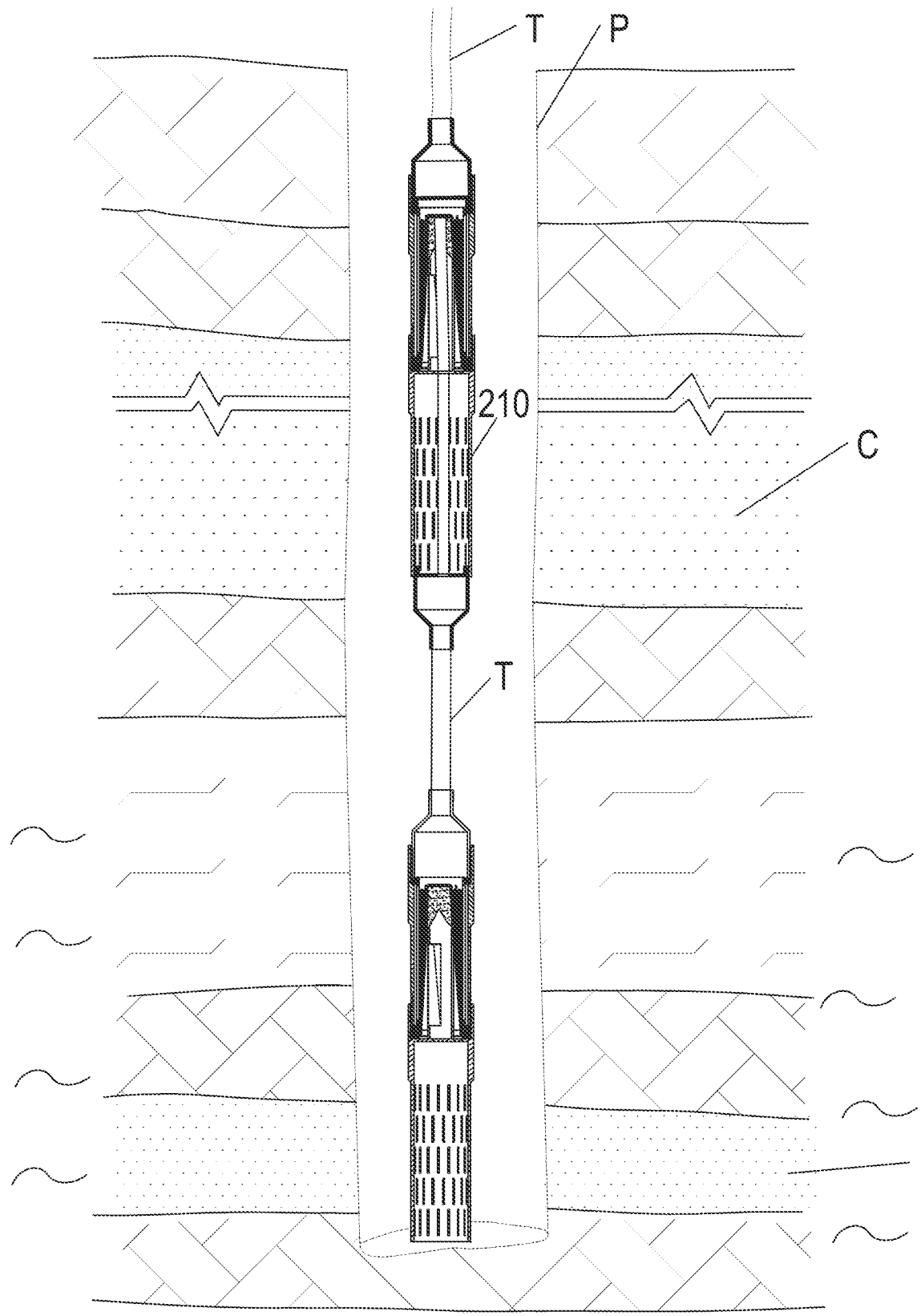
FIG. 10 is partial sectional view of FIG. 9 including a sectional view of a gas producing formation.

Additional forms of a wellbore gas isolation device 210 are provided and shown in FIGS. 9-11. More specifically, the device 210 has an upper section of the tool 213 with an external housing 211 which is of cylindrical configuration having an upper neck coupling or swedge 212, collar 215 and lower threads 217. The housing 211 includes interior threads for engagement with lower threads 217, a circumferential housing 214 with threads 219, an optional aluminum or steel compression ring 224, a perforated cylindrical internal tool insert 222 with a steel ring 238, a wire mesh screen 216, an optional second compression ring 225, a hydrophobic sleeve member 218 with an aluminum flange ring 246, an aluminum separator seal locking ring 228 and a gas/water internal separator support 221 having a baffle plate (not shown). The lower portion of the tool has lower housing member 232 for threaded connection with the housing 214, a perforated boretail 235, a lower swedge 236, collar 241 and neck 243 with opening 245.

Contained within the upper section 213, lower housing 232 and boretail 235 is by-pass gas transport member 239 that includes tubing member 209 with a lower plate 242 and a support ring member. The by-pass tubing 209 is preferably formed of metal but may also be formed of poly-pipe. The tubing 209 is inserted into both the bottom or lower plate 242 with opening 251 and the ring member. The lower plate 242 is preferably formed of metal but may also be made up of poly-pipe or any other type of rigid, non-corrosive substance.

The tool described herein consists of a break down tool that may be assembled to a length of at least 2' to 40' or longer. The components are of shorter length to provide for easy manufacturing, transport and assembly on site. The components are also easily disassembled with a multitude of threaded members. The threaded members are an alternative to use of bolts and other securing mechanisms that may easily fail or corrode over time. The extended length provides additional surface area for gas/water separation allowing for a more efficient separation. The shortened length allows for multiple tools as described to be connected and placed within a single gas formation.

The tool 210 is designed to be positioned within a cased well bore C as shown in FIG. 10. The tool 210 preferably comprises the exterior housing 211 that is made up of 2' to several feet in diameter steel or other non-corrosive material, ranging in length from 2 feet and up to 40 feet and beyond depending upon the diameter of the wellbore and reservoir characteristics of the gas bearing formations. An upper section of the tool 213 has the external housing 211 which is of cylindrical configuration having the upper neck coupling or swedge 212 and upper plate 237 with gas slots 249 present for passage of gas therethrough. The upper plate 237 is preferably formed of metal but may also be made up of poly-pipe or any other type of rigid, non-corrosive substance and is preferably welded to the swedge 212. There is collar 215, lower threads 217, the exterior housing 211 includes interior threads for engagement with lower threads 217, cylindrical wall housing 214 with exterior threading 19 is designed to house interior gas separation elements. The upper section 213 as well as lower section 223 are preferably made up of non-corrosive steel or aluminum.

As shown in FIG. 9, the upper section 213 includes an internal cavity or annulus 220. The collar 215 is circumferentially positioned around the swedge 212. The swedge 212 which includes upper plate 237 is designed to be positioned below the static water level in the wellbore and allows gas to flow up the tubing T to gathering and sales pipelines (not shown) or connection with another tool 210 for gas recovery from different zones as shown in FIG. 10. The tubing T is threaded into the swedge 212. The internal tool annulus 220 and the housing 214 are sized to accommodate the perforated tool insert 222 and the by-pass gas transport member 239. The tool insert 222 is defined preferably by cylindrical walls of 4" aluminum having circumferentially aligned, radially spaced perforations 230, preferably along the entire length of the tool insert, an internal cavity 231 and the outwardly extending rim member or ring 238 having an opposite open end 240 from the rim member 238.

One end of the housing 214 has internal threads for connection to the housing 211 and swedge 212 and lower threaded members 219 for threaded attachment to lower housing 232. As mentioned above, the exterior housing 211 is designed to house tool insert 222, as shown in FIG. 9, with the tool insert 222 defined by a longitudinally slotted circumferential housing having perforations 230 at radially spaced intervals. The perforations or slots are preferably ⅛", and 20¾" length at 45 degrees of one another, depending upon the length of the tool. The perforations will vary depending upon the type of solids present in the gas formation reservoir. The tool insert 222 is preferably made up of non-corrosive steel, aluminum, polypipe, plastic or other suitable material, with any size diameter from 2" to over several feet as long as it will fit into the housing 214 but this may vary depending upon the desired length of the tool 210. The slots aid in gas separation as well as water/solid separation. A stainless-steel screen 216, matching the length and having a slightly smaller interior circumference than the tool insert 222, is inserted in touching relation within the interior of the tool insert 222. The screen cage 216 may be inserted within the internal cavity 231 to line the interior cylindrical walls in touching relation to the perforations 230. The mesh screen is preferably 10 mesh, stainless steel but can be of different composition and still be within the scope of this disclosure.

A gas/water hydrophobic sleeve 218 is placed over a support shell 221, the support shell 221 providing interior support for the separation tool/sleeve 218 and preventing it from collapsing within the isolation tool 210. The sleeve 218 includes a cylindrical rim member 246 that maintains the position of the sleeve member within the tool 210. The tool insert 222 in conjunction with steel compression rim ring 238, aluminum or steel compression ring 225, flange ring 246 and aluminum locking ring 228 ensure a tight connection within the tool as shown in FIG. 9. The sleeve member 218 is preferably made up of hydrophobic material having a single open end 244, closed end 262, and the cylindrical rim member 246 for lower support. The preferred material for the sleeve member 218 is polypropylene but may be comprised of any other hydrophobic fibers such as polyester, nylon, or polypropylene. These fibers may be in the form of staple yarns, flat continuous multi-filaments, or texturized continuous multi-filaments. The hydrophobic nature of the sleeve may also be accomplished using hydrophobic and super hydrophobic coatings such as polymethylhydrosiloxane (PMHS) and polyvinyl chloride (PVC), as an example. The sleeve member is preferably of 1 micron pore size but may also be in the range of 0.6 to 1.1 micron pore size to allow for passage of vaporized gas. The sleeve member 218 is inserted into the cavity 231 of tool insert 222 with the mesh screen 216 located therebetween. The placement of the mesh wire screen 216 between the interior of the tool insert 222 and the sleeve member 218 prevents the sleeve member 218 from passing through the perforations 230.

The gas/water internal separator support 221 is adapted for insertion within the sleeve member 218 and comprising any size from 1" up to several feet in diameter as long as it will fit inside the hydrophobic sleeve 218 and then inside of tool insert 222. Slots 266 are cut every 10 to 60 degrees and are at least or greater than 50% of the total length of support 221. The separator support shell 221 is secured, preferably welded, to a baffle plate (not shown) that is welded to the lower housing 232. The baffle plate 271 has radially aligned perforations that aid in gas/water separation as well as blocking of large debris from passing therethrough.

The by-pass gas transport 239 is designed to extend the length of the hydrophobic sleeve member 218 and preferably includes the bottom plate 242, the by-pass tubing 209 and the ring member 207 that is located at the apex of the sleeve member 218. The tubing 209 preferably consists of small diameter tubing that is inserted within the center of the tool 210 and within the interior of the sleeve member 218 as well as the support 221. The tubing end terminates at the ring member which is located along the upper portion of the sleeve member 218. The ring member is slightly smaller in diameter than the upper portion of the sleeve member 218, allowing for a close fit within the sleeve member. The by-pass transport 239 isolates and carries gas from lower zones in the reservoir, through the tool 210 within the sleeve member 218 so it is interior of the gas-water separation chamber and the isolated gas is commingled with the gas separated from the fluid in the tool 210. The bottom plate 242 of the by-pass gas transport is welded to the swedge 236 and the tubing member 209 is threaded along the interior of the boretail 235 and the sleeve member 218.

The boretail 235 is of cylindrical configuration with circumferential perforations 253 and having a lower opening 267, acting as a solid separation tool. The perforations 253 are sized to allow passage of liquid therethrough but prevent passage of large solids into internal opening or cavity of the bore tail. The dimensional length of each portion of the tool is designed to allow fluid to travel the length of the lower and upper sections to allow for separation of the gas from the production fluid. Preferably, the upper and lower sections 213, 223 are of roughly the same length but variations in dimensions are possible without departing from the scope of the disclosure.

Another form of wellbore gas isolation device 310 is provided and shown in FIG. 11. More specifically, the tool 310 comprises a series of wrapped cylindrical materials. A longitudinally slotted circumferential housing or pipe 312 having perforations 314 at radially spaced intervals is preferably made of highly perforated polyethylene pipe. The pipe 312 may have a diameter in a range of 2" to over 12" depending upon the size of the cased wellbore. The diameter of the pipe 312 must be less than that of the cased wellbore so that the tool 310 may be inserted within the wellbore. The perforations 314 are preferably evenly spaced and are located along the entire length of the pipe 312.

Exterior to the pipe 312 is a hydrophobic membrane 316 which is co-extensive with the pipe 312 and is secured at opposite ends of the membrane 316 to the pipe 312 with a clamping member 318 as shown in FIG. 11. The gas/water hydrophobic sleeve 316 includes dual open ends 317, 319 and is preferably made up of hydrophobic material such as polypropylene but may be comprised of any other hydrophobic fibers such as polyester, nylon, or polypropylene. These fibers may be in the form of staple yarns, flat continuous multi-filaments, or texturized continuous multi-filaments. The hydrophobic nature of the sleeve may also be accomplished using hydrophobic and super hydrophobic coatings such as polymethylhydrosiloxane (PMHS) and polyvinyl chloride (PVC), as an example. The sleeve member is preferably of 1 micron pore size but may also be in the range of 0.6 to 1.1 micron pore size to allow for passage of vaporized gas.

The sleeve member 316 is placed over the pipe 312 and exterior to the hydrophobic member is a protective member 320 made up of stainless steel mesh, preferably #10 mesh, which protects the hydrophobic membrane 316 from wear and tear during transportation and insertion/removal from the wellbore while also allowing passage of water. The placement of the hydrophobic sleeve member between the protective member 320 and the pipe 312 allows passage of gas through the perforations 314 and into the annulus 321 without water or solids passing into the annulus 321 as well. The stainless-steel screen 320, matching the length and having a slightly larger interior circumference than the pipe 312, is preferably 10 mesh stainless steel but can be of different composition and still be within the scope of this disclosure.

The protective member 320 is co-extensive with the hydrophobic membrane 316 and is clamped or secured to the exterior of the hydrophobic membrane 316 with metal clamps 318. Additionally, there are several centralizers 322, preferably at least 2, which are secured to the exterior surface of the wire mesh. The centralizers 322 may be made of a variety of materials, i.e., poly, steel, aluminum without departing from the scope of the disclosure. The form of the centralizers can also be highly variable, but in order to function properly, the form must have an extending surface that provides a space between the casing of the wellbore and the protective member 320. The form of the centralizers 322 provides stabilization and centralization of the tool within the wellbore. The centralizers 322 prevent the tool from leaning or being pushed up against the inside of the cased wellbore, which can decrease the surface area of the hydrophobic membrane 316 that is in contact with gas saturated water in the wellbore.

A single tool 310 can be run on the lower end of the production tubing if the well is only completed in a single zone. In this case a cap (not shown) would be fused/attached to the base of poly cylinder to prevent formation water from entering the tool and possibly traveling uphole into the tubing. Multiple tools 310 can be run adjacent to one another or separated by several feet or several 100's of feet in the wellbore simply by replacing the basal cap with a poly to steel (with threads) transition 332, swedge 336 and placing a threaded nipple 334 between the two attached tools 310 (for adjacent tools) or X feet of tubing for tools 310 spaced a pre-determined distance apart.

In use, the tool 310 or tool 310 may be transported as separate parts and assembled on-site and set below the static water level in the wellbore. Multiple tools may be inserted within a single casing. Due to the potential length of the tool, it may be more cost effective and easier to assemble on site. Referencing tool 210, the lower section 223 of the tool 210 receives gas combined with formation liquid from the well reservoir through the encased well bore. The boretail 235 restricts large solids from entering the bore tail passageway due to the restrictive perforations 255. The perforations may have a range of size due to conditions within the gas reservoir. For example, a reservoir that sheds particulate matter into the wellbore that is smaller in size, such as sand, will have smaller perforations. A tool set within a reservoir that sheds or gives up larger rocks or coal will have larger perforations to block passage of larger material without preventing the passage of water and gas. A mixture of gas and liquid is generated within the boretail 235 with the pressure forcing the mixture through the baffle plate and into the upper section 213 of the tool 210. The addition of the gas transport member 239 allows simultaneous collection of gas from multiple layers of gas formations. The tool 310 is primarily used in cased wellbores in which the solids present in the formation waters are minimal.

Both tool 210 and tool 310 work as described below, if one tool is set one hundred feet below the static fluid level in the wellbore this creates a hydrostatic pressure of approximately 43 psi at this depth under fresh (non-salt) water inside of the cased borehole. The tubing T and both the tool 210 and tool 310 having annulus 220 and 321 are isolated from the approximately 43 psi of hydrostatic pressure by the hydrophobic sleeve membrane 218 and 316. The tubing pressure (and pipeline pressure) are preferably maintained at 5 psi to 20 psi, or at any pressure that is less than the hydrostatic pressure at the depth in the wellbore that the tool is set. This creates a pressure sink in annulus 220 and 321 of the difference between the approximately 43 psi hydrostatic head and pressure inside the annulus 220 and 321; tubing T and the surface gas pipelines (not shown). For example, if the tubing T pressure is 10 psi, the pressure differential is 33 psi ((43 psi (hydrostatic head)−10 psi (tubing T pressure)). The side of the hydrophobic membrane 218 and 316 in contact with the formation water is set at a depth in the wellbore such that the hydrostatic pressure at that depth is greater than the pressure on the side of the hydrophobic membrane that is in contact with the annulus 220 and 321 that connects to the production tubing that runs up to the surface.

In tool 210 the wire mesh is on the gas side of the hydrophobic membrane 218 and in tool 310 the wire mesh is on the water side (outside) of the hydrophobic membrane 316. In both tools, the wire mesh provides support and protection for the hydrophobic membrane. In tool 210, the gas travels through the hydrophobic membrane 218 and then travels upwardly through the annulus 220 into the production tubing to the surface. In tool 310, gas through the hydrophobic membrane 316 to the interior surface of the membrane 116 and upwardly through the annulus 321 of the tool to the production tubing to the surface.

By its very nature, gas will flow towards a point of lowest pressure in the wellbore. The gas dissolved in the coal (or other rock type) formation or production water will flow towards the pressure sink. The addition of the tool 210 or 310 allows gas from the additional gas bearing strata in the wellbore to be separated from the water in the wellbore, then into the tubing for transport to the surface and then thru gas pipelines to gas sales. In the case of the tool 210, insertion of small diameter tubing through the interior of the hydrophobic membrane or sleeve allows for capture and isolation of gas from lower zones for eventual comingling with gas separated from fluid in the standard tool. In this way, tubing T may be threaded into the collar on the top of the stacked tool and threadedly connected to the bottom swedge of an uphole tool as shown in FIG. 10. In the case of the tool 310, formation waters are always on the outside of the tool and hydrophobic membrane, so a bypass tubing is not required. There may be situations where tool 210 and tool 310 can be used in the same wellbore.

If the tool 210 is used, fluid will flow upwardly into the boretail 235 with the perforations 255 blocking solids from entering the tool. The fluid travels upwardly and passes through the baffle plate which further aids in filtering out solids. The fluid then passes through the sleeve member 218, mesh screen 216 and perforated tool insert 222 as discussed previously. The gas is liberated from the fluid or water within the interior of the sleeve member 218, passes through the hydrophobic membrane 218, the mesh cage 216, the tool insert perforations 230 and into the tool annulus 220. Additional gas from tubing T will pass through bottom plate 251, through tubing 209 and ring member then passing through hydrophobic membrane 218 and commingles with the liberated gas. The liberated gas plus the by-pass gas then travels upwardly through the tool and up the tubing T into at least one additional tool 210 for additional gas collection or to a gas gathering pipeline. The addition of at least one tool 210 into the casing allows multiple gas bearing zones in the wellbore to simultaneously produce and contribute to the wells total productive gas volume. There are situations where the gas bearing strata are separated by hundreds or thousands of feet in the cased well bore. In these instances, the casing is typically perforated across this gas bearing strata and often there are many gas bearing zones in a single wellbore. The introduction of additional tools 210 will enable multiple gas bearing zones to be produced simultaneously with a minimal amount of inter-zonal interference using the by-pass gas transport member. Further, the gas produced within the tool will be in addition to the gas that has already been separated from other gas bearing zones lower in the wellbore either by a standard gas separation tool or another tool as described herein.

Formation fluid or water remains within the interior of the tool and generally is not forced upwardly into the tubing T due to the hydrophobic sleeve 218. Under these conditions, biogenic methane may be removed through tubing T while the formation water remains within the wellbore. Under certain conditions, the rock formations already possess liberated gas and it is not necessary to pump or remove de-gassed formation fluid. If desired, the by-pass transport member may be rendered inoperative by plugging opening 251. In this form, gas from a single strata layer may be removed from the reservoir with a single tool.

While the present methods have been described in connection with the illustrated embodiments, it will be appreciated and understood that modifications may be made without departing, from the true spirit and scope.

We claim:

1. A method of separating methane from formation rock types and formation water in a gas producing well, the steps comprising:

selecting a food grade carbohydrate as a nutrient amendment;

diluting said food grade carbohydrate with formation water to form a dilute mixture;

depositing via gravitational forces said dilute mixture into wellbore tubing;
exposing assemblages of microorganisms within said well to said dilute mixture;
incubating said dilute mixture and said microorganisms for a pre-determined period of time for increased biogenic methane production;
introducing an isolation tool within said wellbore, said isolation tool having connected first and second separator sections each having internal cavities;
directing reservoir fluid upwardly into said second separator section of the isolation tool and limiting flow of solids into said first separator section with spaced perforations on said second separator section;
limiting the passage of formation fluid through a hydrophobic sleeve member;
allowing passage of gas through said sleeve member, a mesh member and a perforated tool insert and into an annulus of the tool insert;
gathering isolated gas into transport tubing for passage into surface gas gathering pipelines; and
maintaining the formation fluid within the well.

2. The method according to claim 1 wherein said food grade carbohydrates are selected from the group consisting of glucose, sucrose and fructose.

3. The method according to claim 2 wherein said food grade carbohydrates are sugar molasses and corn syrup.

4. The method according to claim 1 wherein the Steps further include flushing said wellbore tubing with a cleaning agent after depositing said dilute mixture.

5. The method according to claim 1 wherein said isolation tool has a gas bypass transport.

6. The method according to claim 1 wherein said sleeve member has a distal open end and a proximal closed end.

7. The method according to claim 1 wherein said limiting step further includes repelling of the formation fluid with said hydrophobic sleeve.

8. The method according to claim 1 wherein the steps further include threadedly engaging multi-parts of said isolation tool at a well site.

9. The method according to claim 1 wherein the steps further include positioning said isolation tool below the static water level.

10. A method of stimulating biogenic methane production and separating methane from a subsurface reservoir hosting assemblages of methanogenic bacteria including a wellbore extending from the Earth's surface to said subsurface reservoir and having tubing extending from the surface to a depth below the depth of the static fluid level in the wellbore, the method comprising:
inserting a transport member within said subsurface reservoir;
exposing said assemblages of methanogenic bacteria to a set amount of food grade carbohydrates through said transport member;
incubating said methanogenic bacteria and said food grade carbohydrates for increased biogenic methane production;
attaching at least one downhole separator to said tubing;
positioning said at least one downhole separator below the static fluid level, said at least one downhole separator having connected first and second housing sections each having internal cavities and including a bypass gas transport;
removing solids from methane gas/formation water within said subsurface reservoir with said at least one downhole separator, said second housing section having a lower chamber in which the methane gas/formation water enters through perforations;
filtering of the methane gas/formation waters with a hydrophobic membrane, a mesh member and a perforated tool insert;
transporting additional isolated methane gas through said bypass gas transport within said hydrophobic membrane;
commingling said methane gas/formation waters with said isolated methane gas within said first housing section to form commingled methane gas and limiting flow of solids into said first housing section with spaced perforations on said first housing section;
gathering said commingled methane gas into tubing for passage into a gas gathering member; and
maintaining formation fluid within said wellbore.

11. The method according to claim 10 wherein the steps further include attaching said at least one downhole separator to at least one additional downhole separator to create a stacked configuration within said subsurface reservoir.

12. The method according to claim 10 wherein said step of removing solids includes generating dissolved methane gas and formation fluid within a boretail.

13. The method according to claim 10 wherein said food grade carbohydrates are selected from the group consisting of glucose, sucrose and fructose.

14. The method according to claim 10 wherein said step of filtering of the methane gas/formation waters maintains the formation fluid within said wellbore.

15. An improved method of enhancing production of biogenic gas in a subsurface reservoir containing assemblages of microorganisms and separating said biogenic gas from said subsurface reservoir, the steps comprising:
selecting a food grade carbohydrate from the group consisting of sucrose, glucose and fructose;
amending said subsurface reservoir with said food grade carbohydrate;
incubating said microorganisms and said food grade carbohydrate for increased biogenic methane production;
introducing at least one isolation tool within a casing of said subsurface reservoir, said isolation tool having a protective member with upper and lower open ends and an internal cavity sized to accommodate a perforated cylindrical pipe having upper and lower open ends and a hydrophobic member;
off-setting said protective member from a casing within said wellbore with at least one centralizer;
filtering of said biogenic gas/formation waters with said cylindrical pipe and said hydrophobic membrane to separate said biogenic gas;
creating a pressure sink within an annulus of said isolation tool;
gathering said biogenic gas into tubing for passage into a gas gathering member; and
maintaining formation waters within the well.

16. The method according to claim 15 wherein said food grade carbohydrate is molasses or corn syrup or a combination of both.

17. The method according to claim 15 wherein said steps further include diluting said food grade carbohydrate with a fluid.

18. The method according to claim 15 wherein said filtering step further includes liberating dissolved biogenic gas from the formation water with passage of biogenic gas bearing formation water through said cylindrical pipe and said hydrophobic membrane, said dissolved biogenic gas passing through said membrane and into said tubing.

19. The method according to claim 15 wherein said protective member and said hydrophobic member are in touching relationship to one another.

\* \* \* \* \*